United States Patent [19]

Dudash

[11] 4,263,834
[45] Apr. 28, 1981

[54] RIVET AND CONSTRUCTION THEREOF

[75] Inventor: Carl S. Dudash, Enfield, Conn.

[73] Assignee: United Technologies Corporation, Hartford, Conn.

[21] Appl. No.: 970,785

[22] Filed: Dec. 18, 1978

[51] Int. Cl.³ .......................................... F16B 13/04
[52] U.S. Cl. ....................................................... 411/44
[58] Field of Search .................. 85/77, 78, 37, 39; 29/512, 526 A, 522 A, 522 R, 523; 403/408

[56] References Cited

U.S. PATENT DOCUMENTS

| | | | |
|---|---|---|---|
| 3,698,278 | 10/1972 | Trembley | 85/77 X |
| 4,130,369 | 12/1978 | Wojcik | 85/37 X |

FOREIGN PATENT DOCUMENTS

| | | | |
|---|---|---|---|
| 1069718 | 2/1954 | France | 85/77 |
| 78019 | 5/1955 | Netherlands | 85/37 |

Primary Examiner—Ramon S. Britts
Attorney, Agent, or Firm—Norman Friedland

[57] ABSTRACT

A self-flaring rivet and the method of making the same is disclosed. The end remote from the rivet head carries the swaging mechanism that is pulled outwardly to flare the end, inherently applying a tension force. This swaging mechanism also can be designed to remain in the rivet end or be pulled out completely. In the first instance the working stem of the swaging mechanism is broken off.

3 Claims, 10 Drawing Figures

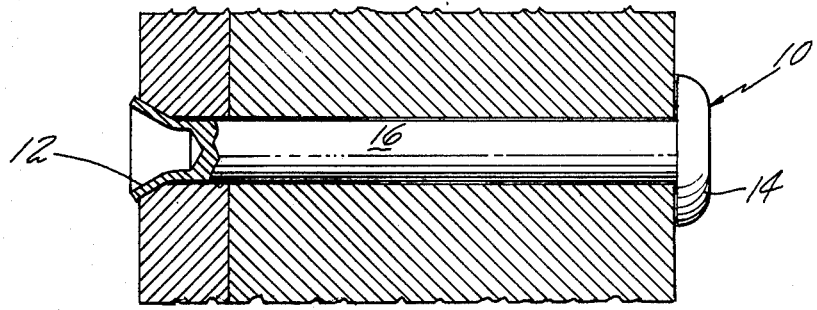
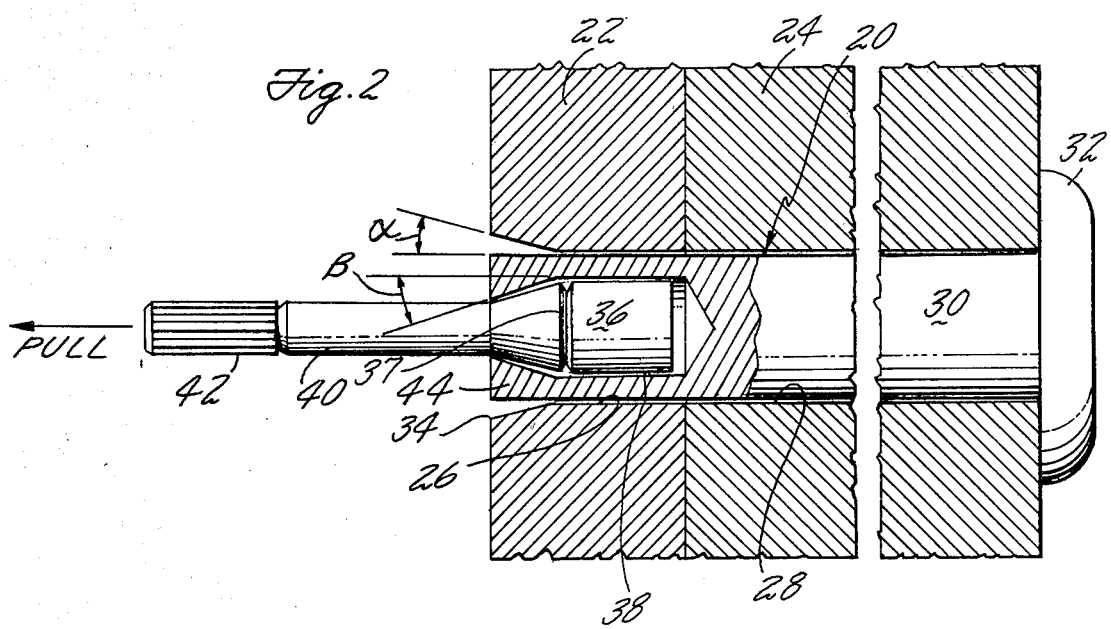
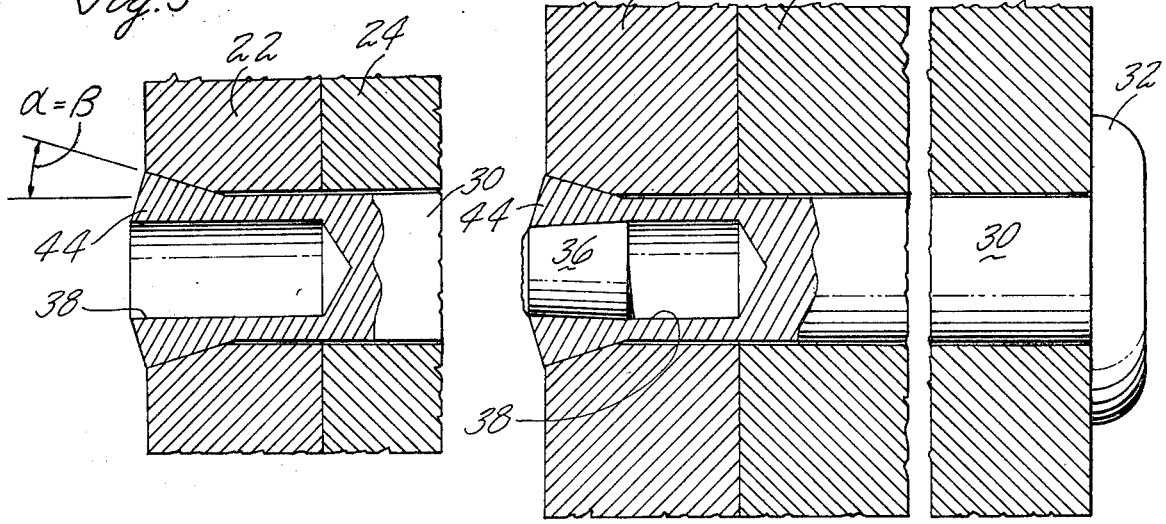

RIVET AND CONSTRUCTION THEREOF

BACKGROUND OF THE INVENTION

This invention relates to rivets and particularly to the type that is flared plus the construction thereof.

The problem solved by this invention is best understood by referring to FIG. 1 which shows a typical, commercially available flared tubular rivet. As noted the rivet 10 after installed in the pieces to be secured is flared at the end 12 opposite the rivet head 14. The following disadvantages are evidenced when this method of riveting is employed:

(1) The flared end must be upset by either impacting or pressing the tubular end putting the rivet shank 16 in compression during assembly. When tool pressure is released, the rivet shank 16 springs back resulting in a loose fit under the rivet head;

(2) The flaring process requires special tooling and experience has shown that, even with production tooling uniform flaring is difficult to achieve; and (3) By virtue of the compression forces the shank 16 occasionally buckles.

I have found that I can obviate the above referred to disadvantages by designing the rivet to carry the swaging mechanism. A grasping handle or stem extending from the externally accessible swaging mechanism of the rivet is pulled to effectuate the flaring of the end by withdrawing of the swaging mechanism. In one embodiment, it is contemplated that the end of the piece being secured is contoured to allow the shear wedge of the rivet to be flared a sufficient distance to hold the rivet in its securing position while retaining the swaging mechanism. It is contemplated that the working stem breaks off while the swaging mechanism is pulled. It is also contemplated that the contouring is such that the swaging mechanism can be completely withdrawn. In both types, the pulling of the swaging mechanism loads the head of the rivet against the face of the member to be secured, thus assuring that the entire rivet is in tension. The purpose of designing the swaging mechanism to remain in the rivet after flaring is to enhance its tension capability. If this tension capacity is not required the rivet can be designed so that the swaging mechanism can be completely removed.

Some of the advantages that are afforded by this invention are listed hereinbelow, but are not limited thereto:

(1) Prevents looseness under manufactured head as experienced with present flared rivets. The rivet shank is put in tension when the stem is pulled to form the flare providing a tight fit under the manufactured head.

(2) Increases tension capability. With the head of the stem remaining in the flared end of the rivet, the "shear wedge" prevents the rivet from pulling out. The tension capability is now determined by shear strength of "shear wedge" and the tensile strength in the tubular portion of the rivet rather than the strength of the flare itself.

(3) Eases and enhances repeatability of the installation. Self-flaring rivet can be made to be compatible with hand upsetting guns used for blind rivets. This eliminates the need for the much more complex and expensive tooling used to upset present flared rivets. This also facilitates assembly in the field. All the features required to flare the rivet properly are built into the rivet itself. Thus, there is no dependence on the skill of the mechanic for proper installation, which should result in significant cost savings.

(4) The self-flaring rivet is not length limited since all the flaring features are contained in the flared end. Standard blind rivets require that the entire length of the shank be drilled to accommodate the stem which is impractical in long lengths.

(5) The self-flaring rivet has a wide variety of shear pin applications. The rivet shank can be a high strength heat treated material with the flared end locally annealed, or, in a two-piece design, the shank can be high strength and the flare end soft.

SUMMARY OF THE INVENTION

A feature of this invention is to provide for a rivet, means for self-flaring the end by pulling on a swaging mechanism carried by the rivet and the method of making the same. Another feature is that by proper contouring and design the swaging mechanism can be made to remain in the rivet or can be made to be completely removed. Another feature contemplated by this invention is that the rivet is always in tension by virtue of the flaring operation.

According to another feature, the rivet may be fabricated from a single piece rivet construction or a double piece rivet construction.

Other features and advantages will be apparent from the specification and claims and from the accompanying drawings which illustrate an embodiment of the invention.

BRIEF DESCRIPTION OF THE DRAWINGS

FIG. 1 is a view partly in elevation and partly in section illustrating a prior art rivet construction securing two elements together;

FIG. 2 is a view partly in elevation and partly in section illustrating the improved rivet of this invention;

FIG. 2A is a view identical to FIG. 2 showing the end flared and the broken off swaging mechanism retained;

FIG. 3 is a view similar to FIG. 2 with a slight modification of the swaging mechanism which permits its complete removal;

DESCRIPTION OF THE PREFERRED EMBODIMENT

Figure 4:
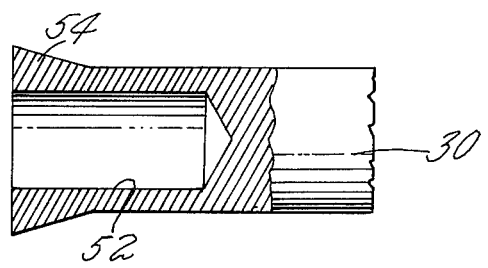
FIG. 4 is a partial view of the end of the rivet illustrating a manufacturing step.
Figure 4A:
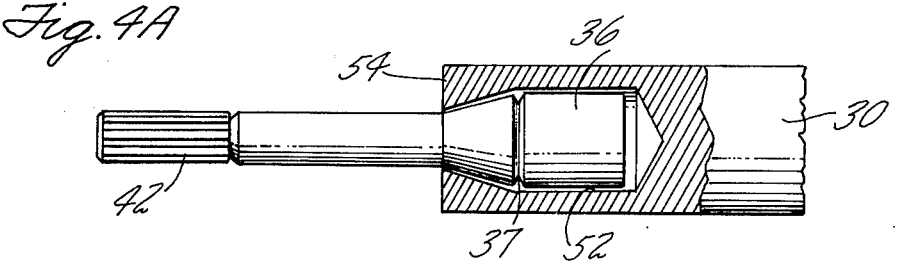
FIG. 4A is a partial view showing the self-contained swaging mechanism.

The self-contained swaging rivet is best seen by referring to FIGS. 2 and 2A which show the rivet, generally illustrated by reference numeral 20, and the elements to be secured, 22 and 24. Typically, the rivet 20 is inserted in the aligned apertures 26 and 28 so that the shank 30 extends from the head 32 to the accessible end 34. On this end the rivet carries the swaging mechanism 36, retained in the recess 38, and its working stem 40, extending beyond end 34. The end 42 of stem 40 may be shaped to receive a suitable commercially available, blind rivet gun.

In operation, the stem 40 is grasped and pulled, which inherently shoulders head 32 against the end of element 24 and places the rivet 20 in tension. By withdrawing the swaging mechanism 36, shear wedge 44 of rivet 20 is forced radially outward causing it to seat as shown in FIG. 2A. The single act of pulling also causes the swaging mechanism to break at the point 37 where it is notched. By contouring the end of aperture 26 so that its angle $\alpha$ is less than the angle $\beta$ formed at the internal cone of shear wedge 44, a portion of the swaging mechanism will be trapped. It is desirable to retain this portion of the swaging mechanism to enhance the rivet's tension capacity.

FIG. 3 is identical to the construction of the rivet shown in FIG. 2 except that the angle $\alpha$ is at least equal to or greater than angle $\beta$. This permits the swaging mechanism to be completely withdrawn for applications where less tension is required. The notch 37 in the swaging mechanism is not required resulting in a less expensive part.

FIGS. 4, 4A, 5, 5A and 6, 6A describe three different methods of fabricating rivet 20 to retain the swaging mechanism.

As noted in FIG. 4 the recess 52 is formed, say by drilling, in the end of shank 30 and the shear wedge 54 extending beyond the rivet's outer diameter. The swaging mechanism is inserted in this recess with the stem extending outwardly. The shear wedge is then swaged to align with the outside diameter of shank 30.

Figure 5:
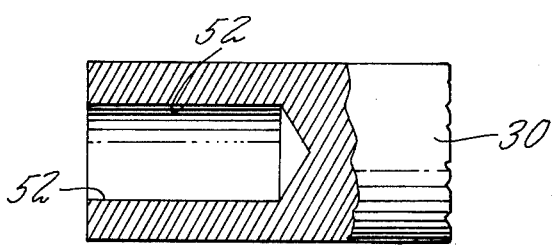
FIG. 5 is a partial view of the rivet showing another manufacturing technique.
Figure 5A:
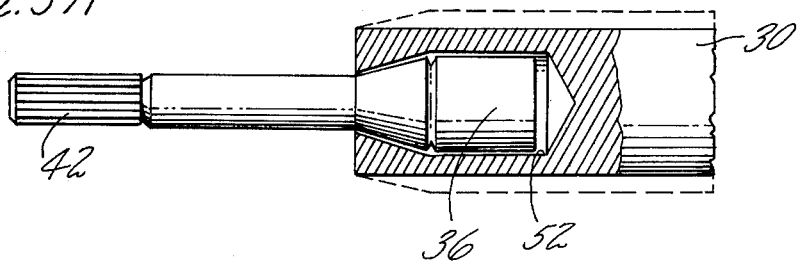
FIG. 5A is a partial view of the rivet of FIG. 5 showing the self contained swaging mechanism

In FIGS. 5 and 5A the recess 52 is formed in the end of shank 30 which is larger than its finished outer diameter. The end is swaged as shown by the dotted line and the outside diameter is grounded to the desired size as shown by the solid lines.

Figure 6:
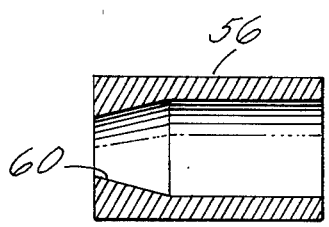
FIG. 6 is a view of the end of the rivet illustrating another manufacturing technique.
Figure 6A:
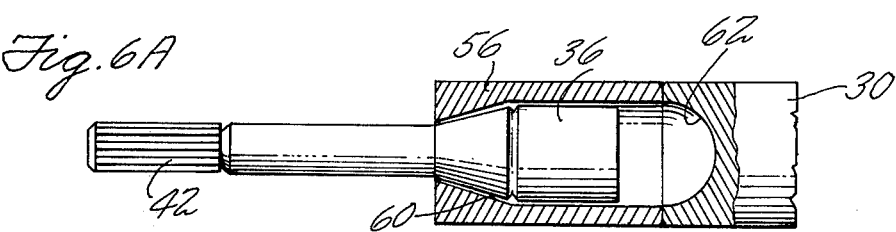
FIG. 6A is a partial view of the rivet of FIG. 6 showing the self-contained swaging mechanism.

FIGS. 6 and 6A show the shank constructed in two pieces. The end piece 56 of shank 30 is drilled completely through and shaped to have the conical wedge 60. The swaging mechanism is inserted and piece 56 is inertia or butt welded to the shank 30. Recess 62 may be formed at the end of shank 30 to reduce stress concentration at the weld joint. End piece 56 may be made from a softer material than shank 30 to facilitate flaring.

It should be understood that the invention is not limited to the particular embodiments shown and described herein, but that various changes and modifications may be made without departing from the spirit and scope of this novel concept as defined by the following claims.

I claim:

1. A rivet for securing two separate elements to each other and having a head bearing against one face of one of said two elements and a shank extending through complimentary openings formed in said two elements, a recess formed in said shank at one end remote from said head, a shear wedge portion formed on said one end, a self-contained swaging mechanism in said recess, said swaging mechanism having a stem of a smaller diameter than the swaging mechanism and extending externally of said rivet to be engaged for flaring said shear wedge, a conical portion interconnecting the larger diameter of said swaging mechanism and said stem and defining a working surface so when said stem is pulled, the conical portion swaging mechanism flares said shear wedge for fastening said rivet and imparting a tension load on said shank, and said tension load imparted through said head to force each of said two elements to bear against each other.

2. A rivet as in claim 1 wherein said shear wedge includes a frusto concially shaped portion on its inner diameter having the base portion intermediate the end of the shank and head and the apex portion at the end of said shank, said conically shaped portion forming an angle relative to the inner diameter of said recess, the end of said secured elements being beveled at the aperture receiving said rivet and defining an angle which is less than the angle of said conically shaped portion whereby said swaging member is retained after the shear wedge is flared.

3. A rivet as in claim 2 wherein said angle of said conically shaped portion is equal to or greater than the angle of said bevel so that said swaging mechanism is completely removed when said rivet is flared.

* * * * *